STEWART & WEMYSS.
Heating-Stove Plate.
No. 80,235.
Patented July 21, 1868.
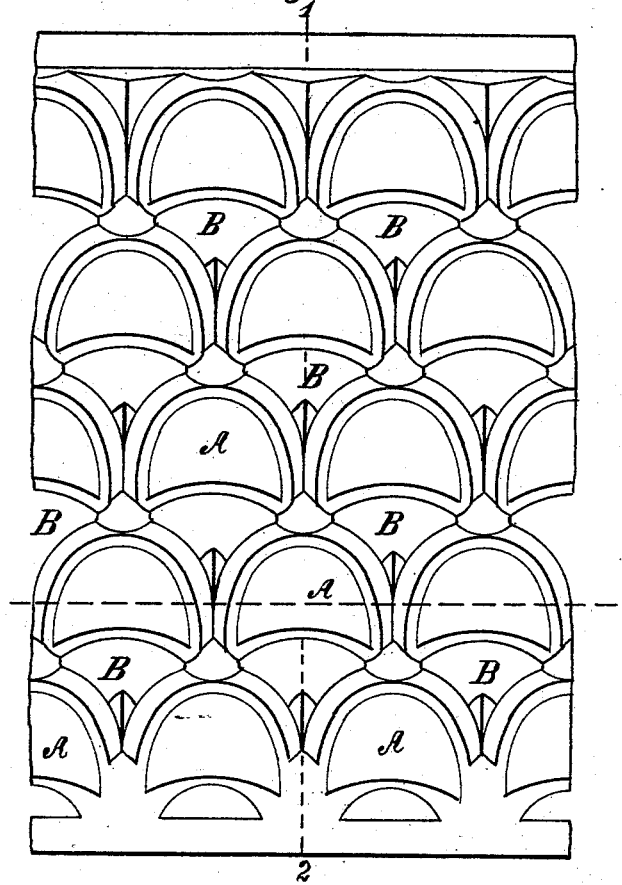
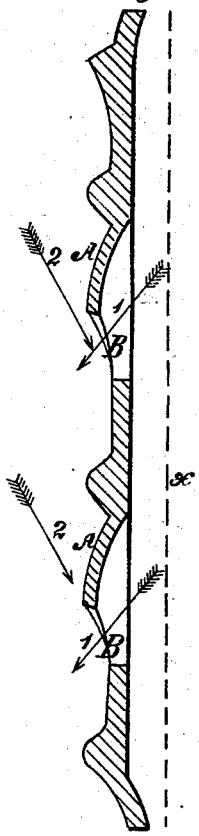
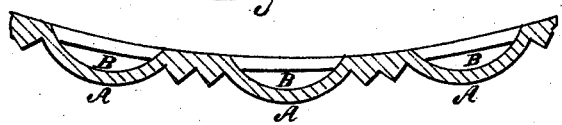

United States Patent Office.

DAVID STUART AND ALEXANDER WEMYSS, OF PHILADELPHIA, PENNSYLVANIA, ASSIGNORS TO STUART, PETERSON, AND COMPANY, OF SAME PLACE.

*Letters Patent No. 80,235, dated July 21, 1868.*

IMPROVEMENT IN STOVE-PLATES.

*The Schedule referred to in these Letters Patent and making part of the same.*

TO ALL WHOM IT MAY CONCERN:

Be it known that we, DAVID STUART and ALEXANDER WEMYSS, of Philadelphia, Pennsylvania, have invented an Improved Guard-Plate for Stoves; and we do hereby declare the following to be a full, clear, and exact description of the same.

Our invention relates to improvements in the perforated plates which are commonly placed in front of or surround the fire-pots of stoves, and our improvements, fully described hereafter, are such, that the plates will more effectually conceal the surface of the pot than ordinary plates, and will at the same time direct the radial heat downwards towards the floor.

In order to enable others skilled in the art to make and apply our invention, we will now proceed to describe the mode of constructing and using the same, reference being had to the accompanying drawing, which forms a part of this specification, and in which—

Figure 1 is a face view of a portion of our improved guard-plate for stoves.

Figure 2, a vertical section on the line 1–2, fig. 1, and

Figure 3 a sectional plan on the line 3–4, fig. 1.

Similar letters refer to similar parts throughout the several views.

It has been usual to surround the cast-iron pots of stoves, with a view of partially concealing the same, and at the same time permitting the free escape of the radial heat, with a tracery of cast-iron or open-work shields or guards, the further object of which is to add to the symmetry of the stove.

As heretofore constructed, these guards failed to conceal the fire-pot to the extent desirable, for while the open spaces permitted the escape of the radial heat, they exposed to view the dingy surface of the pot.

Our improved guard-plate consists of a series of projections, A, united by any desired ornamental tracery, and so arranged as to leave open spaces, B. In the present instance, the projections A consist of sections of hollow spheres, and may be termed deflecting shields, as they serve to direct the radial heat downwards, in the course pointed out by the arrows, 1, through the openings B. The shields thus possess the advantage of directing the heat to the floor where it is most available for its proper dissemination throughout the apartment containing the stove.

The deflectors possess the further advantage of effectually concealing the fire-pot, which is always at the base of the stove, and so near the floor that the lines of vision may be represented by the arrows 2 2, fig. 2. While the openings B B, therefore, are visible, and the guard loses nothing of its ornamental appearance, the surface of the fire-pot beyond the openings, say on the dotted line $x$, cannot be perceived.

It is not essential that the deflectors should be in the form of sections of hollow spheres; they may be of different shapes, provided they project outwards above the openings. The method of uniting the shields, and the general ornamentation of the guard-plate, may also be modified without departing from the main feature of our invention.

We claim as our invention, and desire to secure by Letters Patent—

A guard-plate, having deflecting shields and open spaces, arranged substantially in the manner and for the purpose set forth.

In testimony whereof, we have signed our names to this specification in the presence of two subscribing witnesses.

DAVID STUART,
ALEXANDER WEMYSS.

Witnesses:
WALTER BOSWELL,
ANDW. J. BOSWELL.